(12) United States Patent
Zettner (10) Patent No.: US 8,429,045 B1
(45) Date of Patent: *Apr. 23, 2013

(54) SYSTEM AND METHOD TO PROVIDE AN EMAIL ACCOUNT

(75) Inventor: Steven Dale Zettner, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 609 days.

This patent is subject to a terminal disclaimer.

(21) Appl. No.: 11/831,044

(22) Filed: Jul. 31, 2007

(51) Int. Cl.
*G06Q 40/00* (2006.01)

(52) U.S. Cl.
USPC .............................. 705/35; 705/37

(58) Field of Classification Search ............ 705/35, 705/37
See application file for complete search history.

(56) References Cited

U.S. PATENT DOCUMENTS

| | | | |
|---|---|---|---|
| 6,047,268 A * | 4/2000 | Bartoli et al. ............... 705/35 |
| 6,098,053 A * | 8/2000 | Slater .......................... 705/44 |
| 6,223,168 B1 | 4/2001 | McGurl et al. | |
| 6,684,248 B1 | 1/2004 | Janacek et al. | |
| 7,016,877 B1 | 3/2006 | Steele et al. | |
| 7,177,909 B2 | 2/2007 | Stark et al. | |
| 7,239,877 B2 | 7/2007 | Corneille et al. | |
| 7,287,009 B1 * | 10/2007 | Liebermann ............... 705/42 |
| 7,461,265 B2 | 12/2008 | Ellmore | |
| 7,848,972 B1 * | 12/2010 | Sharma ....................... 705/34 |
| 2004/0158522 A1 * | 8/2004 | Brown et al. ............... 705/40 |
| 2005/0192899 A1 | 9/2005 | Reardon | |
| 2006/0101278 A1 | 5/2006 | Kobayashi | |
| 2007/0005428 A1 * | 1/2007 | Jacobs et al. ............... 705/14 |
| 2008/0189185 A1 * | 8/2008 | Matsuo et al. ............. 705/21 |

* cited by examiner

*Primary Examiner* — Thomas Dixon
*Assistant Examiner* — Benjamin S Fields
(74) *Attorney, Agent, or Firm* — Brooks, Cameron & Huebsch, PLLC (57) ABSTRACT

Disclosed are systems and methods to provide an email account. The systems and methods provide techniques wherein an email account is provided by a provider to a member, the system having at least one subsystem to provide a financial account for the member, provide an email account to the member, and integrate the financial account and the email account on an Internet site, thereby allowing the member to have access to the email account and the financial account on the Internet site.

21 Claims, 6 Drawing Sheets

SYSTEM AND METHOD TO PROVIDE AN EMAIL ACCOUNT

CROSS REFERENCE TO RELATED APPLICATIONS

The present application is related to (1) U.S. Utility application Ser. No. 11/830,988, filed Jul. 31, 2007, and (2) U.S. Utility application Ser. No. 11/831,004, filed on Jul. 31, 2007, the disclosures which are incorporated herein by reference.

FIELD OF THE DISCLOSURE

Various embodiments of the disclosure pertain to a system and method to provide an email account. More specifically, an embodiment of the disclosure pertains to a system and method to provide a member of a financial services organization an account that provides the member with access to their email account and their financial accounts.

BACKGROUND

Providing a traditional email account and corresponding email address is well-known and readily appreciated by those of skill in the art. However, email addresses are generally provided by an employer, Internet service provider (ISP), or free email service provider. One problem with employer provided email accounts is that if the employee leaves the employer, contacts of the employee have a difficult time tracking down the employee because the employee loses their employer provided email address. A problem with ISP provided email accounts is that ISP customers tend to continually shop around for the best and/or cheapest ISP. Upon leaving their present ISP, the customer loses their ISP provided email address. Free on-line email accounts tend to be limited in capabilities and may link many unwanted solicitations to the email account holder.

Financial services organizations commonly provide on-line access to financial accounts for checking balances, performing transactions, purchasing products or services, and a variety of other financial services known in the art. However, these financial services organizations do not provide other internet services for customers or members of the financial institution. Thus, the use of a financial organization's web site by its customers or members is very limited.

Accordingly, it would be desirable to provide an improved system and method to provide an email account.

SUMMARY

Various embodiments of the present disclosure are directed to systems and methods to provide an email account. The systems and methods provide techniques wherein an email account is provided by a provider to a member, the system having at least one subsystem to provide a financial account to the member, provide an email account to the member, and integrate the financial account and the email account on an Internet site, thereby allowing the member to have access to the email account and the financial account on the Internet site.

BRIEF DESCRIPTION OF THE DRAWINGS

FIG. 1b is a schematic view illustrating an embodiment of an information handling system used with the system to provide an email account of FIG. 1a.

FIG. 1c is a schematic view illustrating an embodiment of a provider used in the system to provide an email account of FIG. 1a.

DETAILED DESCRIPTION

Figure 1A:
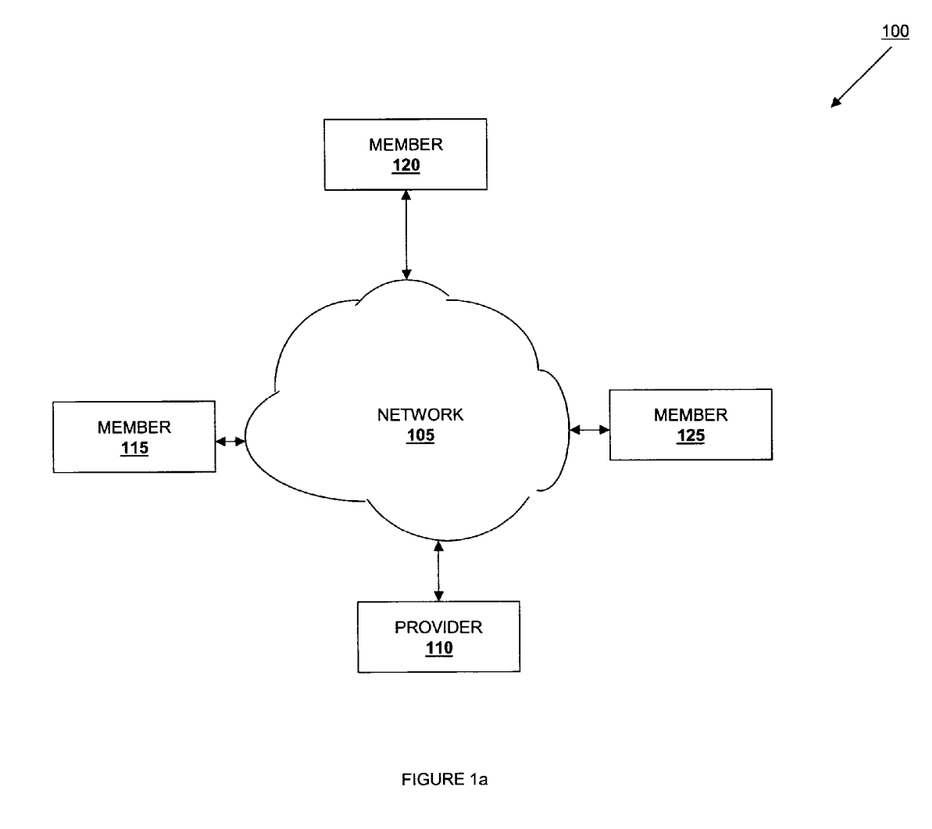
FIG. 1a is a schematic view illustrating an embodiment of a system to provide a member email account.

Referring now to FIG. 1a, in one embodiment, a system to provide an email account 100 is illustrated. The system 100 includes a computer network 105 such as, for example, a Transport Control Protocol/Internet Protocol (TCP/IP) network (e.g., the internet or an intranet). A provider 110 is operably coupled to the network 105. A plurality of members 115, 120 and 125 are also operably coupled to the network 105 in order to allow communication between the members 115, 120 and 125 and the provider 110. In an embodiment, the provider 110 includes a financial services provider that provides a plurality of financial services and financial accounts to its members such as, for example, banking accounts, investment accounts, retirement accounts, insurance accounts, financial services accounts, loan providing accounts, and/or a variety of other accounts known in the art. In an embodiment, the provider 110 includes a membership organization, wherein the members include members 115, 120 and 125. In an embodiment, the provider 110 is a third party to a member and financial service provider where the financial service provider provides a plurality of financial services and financial accounts to its members such as, for example, banking accounts, investment accounts, retirement accounts, insurance accounts, financial services accounts, loan providing accounts, and/or a variety of other accounts known in the art. In an embodiment, the members 115, 120 and/or 125 may be anyone using a financial service such as, for example, a savings or checking account, a brokerage account, an insurance account, or anyone associated with someone using similar financial products or services.

Each of the provider 110 and the members 115, 120 and 125 includes a respective network interface for communicating with the network 105 (e.g., outputting information to, and receiving information from, the network 105), such as by transferring information (e.g., instructions, data, signals) between such customers and the network 105. Accordingly, through the network 105, the provider 110 communicates with the members 115, 120 and 125, and the members 115, 120 and 125 communicate with the provider 110.

For clarity, FIG. 1a depicts only one provider 110. However, the system 100 may include a plurality of providers. Likewise, for clarity, FIG. 1a depicts only three members 115, 120, and 125. However, the system 100 may include a plurality of members.

Each of the provider 110 and the members 115, 120 and 125 includes a respective information handling system (IHS) 130, a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other. Accordingly, the provider 110 and the members 115, 120 and 125 operate within the network 105.

An IHS 130 is an electronic device capable of processing, executing or otherwise handling information. Examples of an IHS 130 include a server computer, a personal computer (e.g., a desktop computer or a portable computer such as, for example, a laptop computer), or a handheld computer. Examples of an IHS 130 also include a router, a switch and other devices coupled to a network (e.g., the network 105).

Figure 1B:
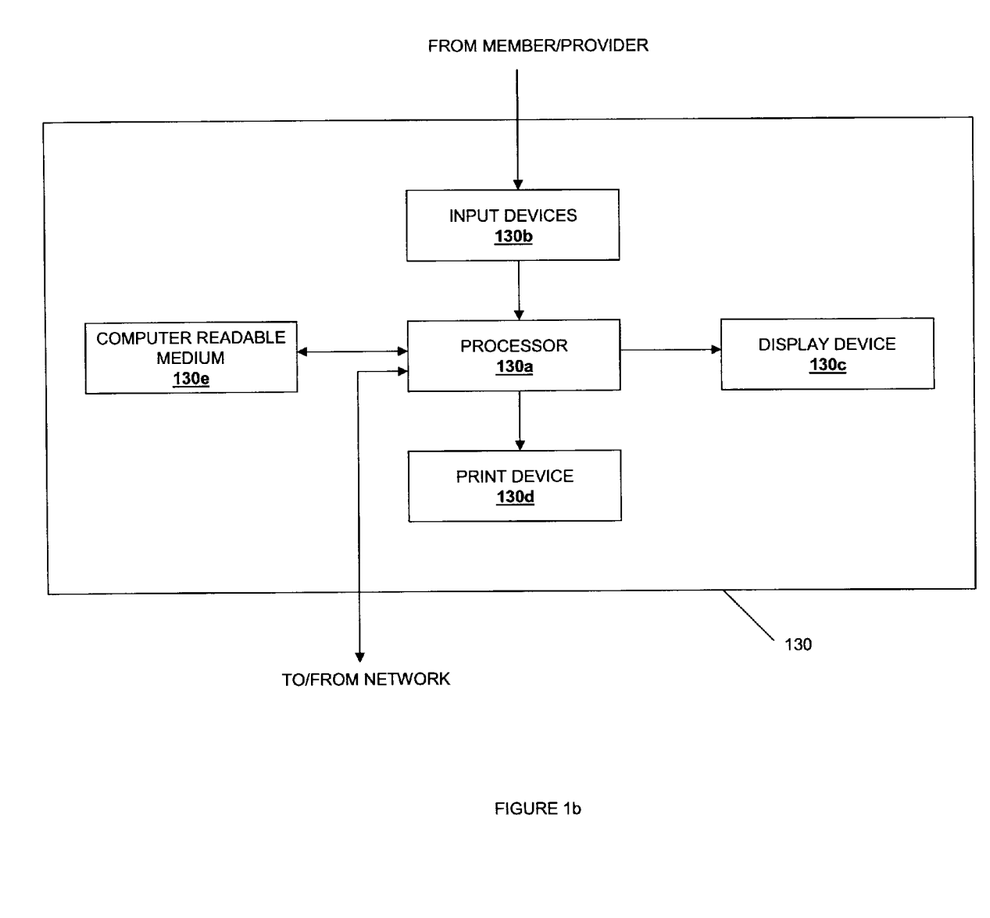

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer readable medium 130e and the processor 130a are structurally and functionally interrelated with one another as described below in further detail. Each IHS 130 of the illustrative embodiment is structurally and functionally interrelated with a respective computer readable medium, similar to the manner in which the processor 130a is structurally and functionally interrelated with the computer readable medium 130e. In that regard, the computer readable medium 130e is a representative one of such computer readable media including, for example, but not limited to, a hard disk drive.

The computer readable medium 130e stores (e.g., encodes, records, or embodies) functional descriptive material (e.g., including but not limited to software (also referred to as computer programs or applications) or data structures). Such functional descriptive material imparts functionality when encoded on the computer readable medium 130e. Also, such functional descriptive material is structurally and functionally interrelated to the computer readable medium 130e.

With such functional descriptive material, data structures define structural and functional interrelationships between such data structures and the computer readable medium 130e (and other aspects of the system 100). Such interrelationships permit the data structures' functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130a reads (e.g., accesses or copies) such functional descriptive material from the computer readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer readable medium) for causing the processor 130a to perform additional operations (as described elsewhere herein). Accordingly, such functional descriptive material exhibits a functional interrelationship with the way in which processor 130a executes its processes and performs its operations.

Further, the computer readable medium 130e is an apparatus from which the computer application is accessible by the processor 130a, and the computer application is processable by the processor 130a for causing the processor 130a to perform such additional operations. In addition to reading such functional descriptive material from the computer readable medium 130e, the processor 130a is capable of reading such functional descriptive material from (or through) the network 105 which is also a computer readable medium (or apparatus). Moreover, the memory device of the IHS 130 is itself a computer readable medium (or apparatus).

Figure 1C:
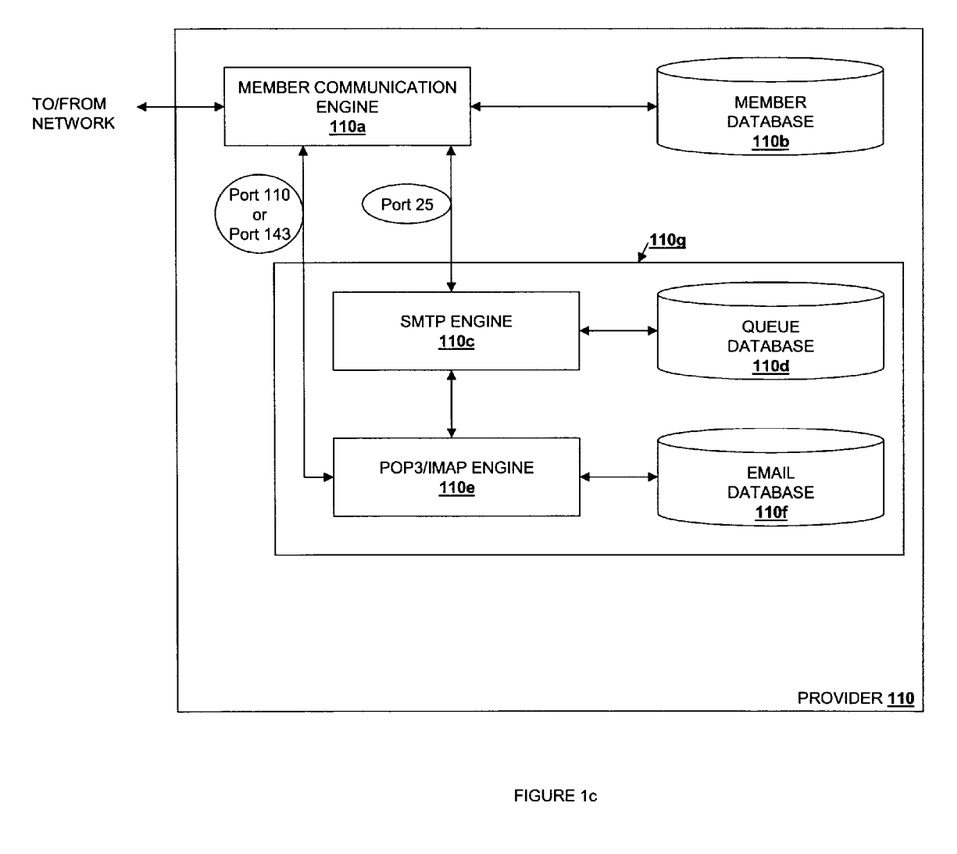

Referring now to FIGS. 1a, 1b and 1c, the provider 110 is illustrated in more detail. A member communication engine 110a which may be, for example, software stored on the computer-readable medium 130e in the IHS 130, is included in the provider 110 and is operably coupled to the network 105, described above with reference to FIG. 1a, and to a member information database 110b. In addition, the member communication engine 110a may include a web server and/or associated hardware and software, as is commonly known by those skilled in the art. A simple mail transfer protocol (SMTP) engine 110c which may be, for example, software stored on the computer-readable medium 130e in the IHS 130 or a representative of the provider 110, is included in the provider 110 and is operably coupled to an email queue database 110d, the member communication engine 110a, and to the network 105, described above with reference to FIG. 1a. A post office protocol (POP3)/Internet mail access protocol (IMAP) engine 110e which may be, for example, software stored on the computer-readable medium 130e in the IHS 130 or a representative of the provider 110, is included in the provider 110 and is operably coupled to an email database 110*f*, the member communication engine 110*a*, the SMTP engine 110*c*, and to the network 105, described above with reference to FIG. 1*a*. In an embodiment, the SMTP engine 110*c*, the POP3/IMAP engine 110*e*, the queue database 110*d*, and the email database 110*f* provide an email server 110*g*. In an embodiment, the member information database 110*b*, the queue database 110*d*, and/or the email database 110*f* are conventional databases known in the art. In an embodiment, the member information database 110*b*, the queue database 110*d*, and/or the email database 110*f* may be located outside the provider 110 and still operably coupled to the provider 110 and the member communication engine 110*a* through, for example, the network 105, described above with reference to FIG. 1*a*. In an embodiment, the member information database 110*b*, the queue database 110*d*, and/or the email database 110*f* each may include a plurality of databases. In an embodiment, the provider 110 is a membership organization and the member information database 110*b* includes a variety of previously collected information on members of the membership organization and/or information on all of the financial accounts held by each of the members. In an embodiment, the member information database 110*b*, the queue database 110*d*, and/or the email database 110*f* are publicly available databases. In an embodiment, the member information database 110*b*, the queue database 110*d*, and/or the email database 110*f* are private databases which are available to be accessed by the provider 110.

Generally, an email system works by using a software commonly known as an email client on an IHS 130 to compose and receive email messages for an email account. Email is composed by, for example, creating a message including, for example, text, pictures, and various files, using the email client. The email client sends the text message through what is commonly known as port 25 to the SMTP engine 110*c* via the member communication engine 110*a*. The SMTP engine 110*c* places the message in the queue database 110*d* for storage until the message can be sent to a recipient over the network 105. When receiving a message, the email server 110*g* may receive that message via the network 105 and the member communication engine 110*a* through what is commonly known as port 110 for POP3 or what is commonly known as port 143 for IMAP. The email server 110*g* then stores the message in the email database 110*f* until the message can be read and deleted. It is understood that other embodiments not shown may be used to perform the operations of the email server 110*g*. In an embodiment, the email database 110*f* may include a plurality of folders for storing information such as, for example, the messages for each email account provided by the provider 110.

Referring now to FIGS. 1*a*, 1*b*, 1*c* and 2, an embodiment of a login page 200 is illustrated. In an embodiment, the login page 200 is an Internet web page that is located on an internet site. The member 115 may use the login page 200 to log in, or gain access, to an email account. The provider 110 may use software and/or hardware located local to the IHS 130 to support the email accounts and thus create a local pc based email system. Additionally, the provider 110 may use software and/or hardware located remotely and accessed via a the network 105 to support the email accounts and thus create an Internet browser-based email system. The login page 200 includes a member identification (ID) field 205 and a password field 210. In an embodiment, the member 115 may enter a member identifier in the member ID field 205 and enter a member password in the password field 210 to gain access to a secured web site of the provider 110 that includes the email account of the member 115. Once logged in, the member 115 may perform email operations such as, for example, compose emails, sending emails, receiving emails, reading emails, and a variety of other email operations known in the art. It is understood that email messages may includes text messages and attachments such as, for example, picture files, audio files, video files, and a variety of other files known in the art. Thus, in an embodiment, the member 115 is provided online email account access.

Figure 2:
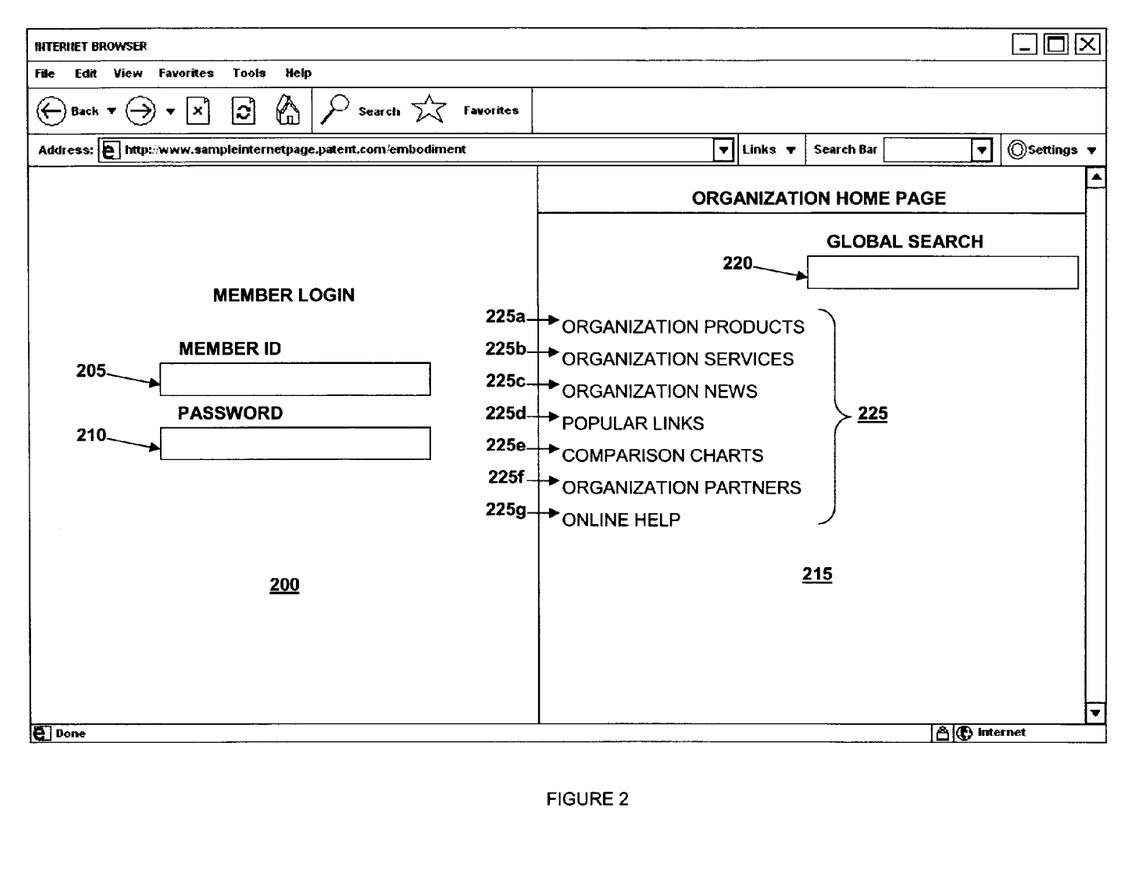
FIG. 2 is a screen shot illustrating an embodiment of a login page and start page.

Also illustrated in FIG. 2 is an embodiment of a publicly accessible portion of a start page 215 of the provider 110. In an embodiment, the start page 215 is an internet web page that is located on an internet site. The start page 215 may include, for example, a global search field 220, a plurality of links 225, text, graphics, and a variety of other items known in the art. In an embodiment, the plurality of links 225 on the start page 215 may include organization products 225*a*, organization services 225*b*, organization news 225*c*, popular Internet links 225*d*, comparison charts 225*e* (for example, for comparing the provider's 110 products or services to a competitor's), organization business partners 225*f*, help 225*g* (for example, to contact online or live help with the provider's web site and/or the provider's products and services) and/or a variety of other links known in the art. It is understood that the login page 200 and the start page 215 may include more or less text, graphics, fields, and the like, as desired by the provider 110.

Referring now to FIGS. 1*a*, 1*b*, 1*c*, 2, and 3, an embodiment of a user page 240 is illustrated. The member 115 may access the user page 240 subsequent to providing a member identifier in the member ID field 205 and a member password in the password field 210. In an embodiment, the user page 240 provides the member 115 access to a email account that is provided by the provider 110, along with access to financial accounts of the member 115 that are provided by the provider 110 and a plurality of internet links. In an embodiment, the provision of a member identifier in the member ID field 205 and a member password in the password field 210 provides the member 115 access to the email account and the financial account with a single login, greatly simplifying the experience of the member 115 with respect to access to the email account and financial account. In an embodiment, using the user page 240, the member 115 may securely access a personal account section 245 that includes personal accounts provided by the provider 110 and belonging to the member 115 such as, for example, a savings account 245*a* of the member 115, a checking account 245*b* of the member 115, an IRA account 245*c* of the member 115, an investments account 245*d* of the member 115, an insurance account 245*e* of the member 115, and a variety of other financial account known in the art that are provided by the provider 110 and belong to the member 115. Upon accessing a personal account in the personal account section 245, the member 115 may perform transactions relating to those accounts such as, for example, banking account transactions such as checking the account value and transferring funds, investment account transactions such as funding the investment account, buying and selling securities, and checking the account value, retirement account transactions such as funding the account and purchasing different retirement products, insurance accounts transactions such as purchasing insurance and changing deductibles or premiums, financial services accounts such as asking for and receiving investment advice and filling out a will or trust, loan providing transactions such as applying for a loan and paying on a loan already provided, and/or a variety of other transactions known in the art. Thus, in an embodiment, the member 115 is provided online financial account access. Security features such as, for example, encoding and decoding of electronic data, passwords, biometrics, and a variety of other security features known in the art may be used to allow the member 115 the ability to safely perform secured financial and other transactions in an account accessible through the personal accounts section 245. Additional features may be accessible from the user page 240 such as, for example, a secure document archive link 245f, sections providing links to the start 215 including the global search 220 and the internet links 225, described above with reference to FIG. 2, links for the member 115 to view news articles in news section 250, and links to a member email account 255. Thus, the provider 110 provides an email account that provides the member 115 an email address (e.g. member115@provider110.com) and integrates that email account service with a website that allows financial account access.

In an embodiment, the provider 110 is a third party to a member and financial service provider where the financial service provider provides a plurality of financial services and financial accounts to its members such as, for example, banking accounts, investment accounts, retirement accounts, insurance accounts, financial services accounts, loan providing accounts, and/or a variety of other accounts known in the art. The provider 110 may host an conventional email server and a conventional web server on an information handling system such as, for example, the information handling system 130, described above with reference to FIG. 1b. In an embodiment, the email server may be hosted on a first information handling system and the web server may be hosted on a second information handling system. The provider 110 may then coordinate with the financial service provider such that email server and the web server are operated to provide the email account access and the financial account access to the member as described above.

Referring now to FIGS. 1a, 1b, 1c, 2, 3, and 4, an embodiment of a method to provide a member email account 300 is illustrated. The method 300 begins at step 305 where the provider 110 provides a financial account for the member 115, 120, and/or 125. As described above, the financial account may be a banking account, investment account, retirement account, insurance account, financial services account, loan providing account, and/or a variety of other financial accounts known in the art. In an embodiment, the provider 110 manages the financial accounts and/or email accounts provided to the member 115 by third parties. The method 300 then proceeds to step 310 where the provider 110 provides an email account for the members 115, 120, and/or 125. The method 300 then proceeds to step 315 where the provider 110 integrates the financial account and the email account on an Internet site, thereby allowing the member 115, 120, and/or 125 to have access to the email account and the financial account on the Internet site.

Figure 3:
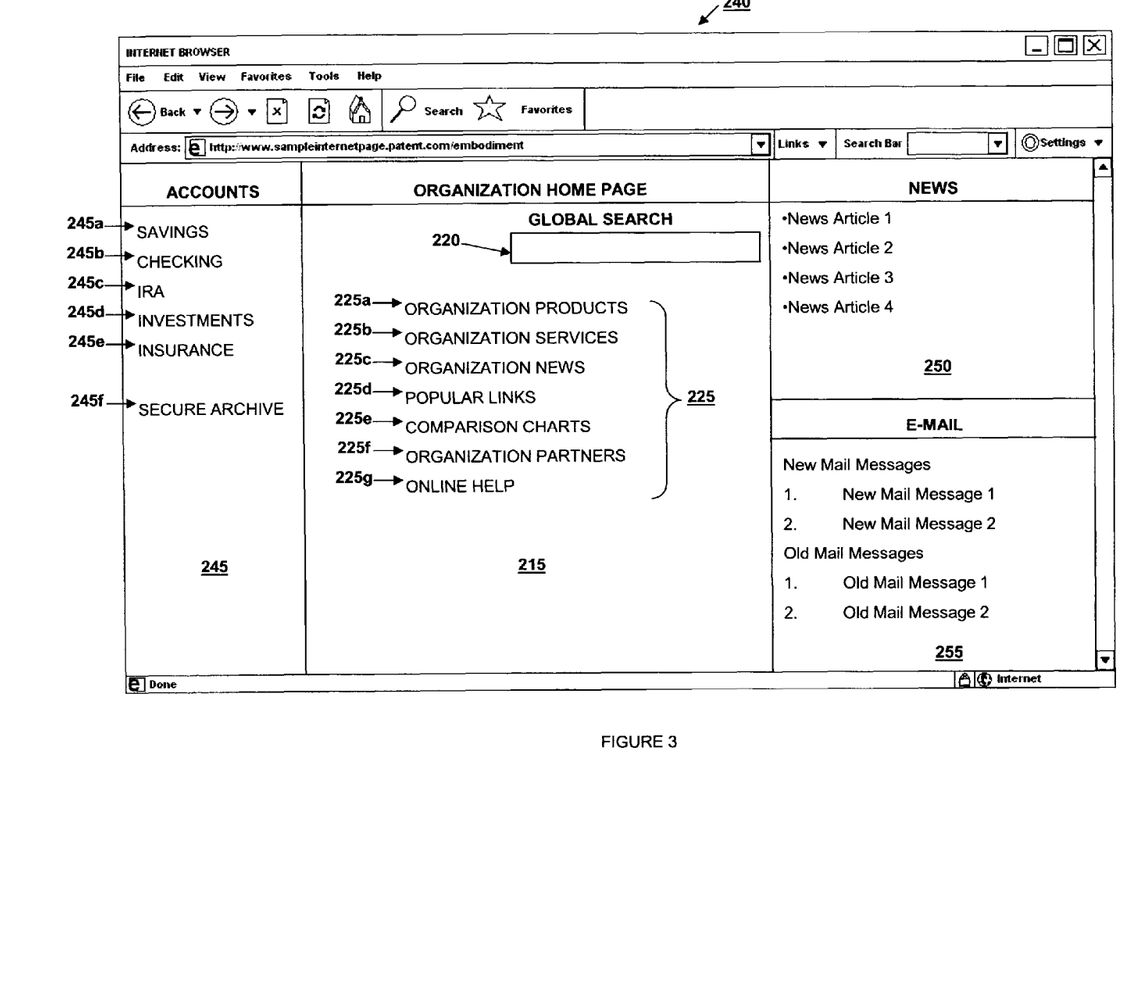
FIG. 3 is a screen shot illustrating an embodiment of an user page.
Figure 4:
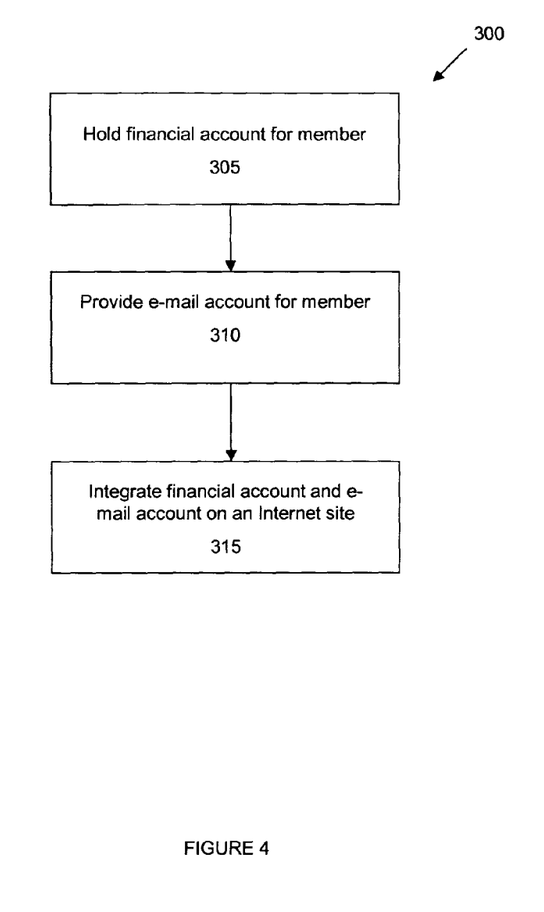
FIG. 4 is a flow chart illustrating an embodiment of a method to provide an email account.

An embodiment of the system and method provided allows the members 115, 120, and/or 125 to access and utilize a secure document archive through the secure document archive link 245f in the personal account section 245. The secure document archive may be a repository for online documents and/or a secure document exchange system where members may securely store documents such as, for example, any electronic file, exchange documents with the provider 110 and/or $3^{rd}$ parties, perform electronic signatures on documents, and/or a variety of other secured document activities known in the art. In an embodiment, the member 115, 120, and/or 125 may select the secure document archive link 245f to perform secured financial transactions. For example, secured financial transactions may include the selling of goods and/or services using security systems for such transactions as understood by those ordinarily skilled in the art. In another example of a secured financial transaction, the provider 110 may store a credit card application on the secure document archive for the member 115, and the member 115 may access the blank credit card application, fill in the required fields, and post the completed application for review by the provider 110 such that the provider may retrieve the completed application from the secure document archive. If the member 115 is approved for a credit card, the provider 110 may then send an email message to the email account provided to the member 115 to inform the member 115 of the approval. These and any other steps necessary to supply and complete a credit card application may take place through the user page 240. In an embodiment, the member 115 may utilize the secured document storage archive for transactions that are similar to those described above with $3^{rd}$ parties. In an embodiment, secured financial transactions may include any transaction using the secure document archive to request and provide electronic signatures. Electronic signatures use systems and methods to ensure an electronic document such as, for example, an email message, a text file, or a variety of other electronic documents, are authentic, un-altered, and sent to and/or from a trusted source. In an embodiment, electronic signatures use encryption to ensure authentication of the document, the sender, and/or the sendee. In an embodiment, electronic signatures may be used from the secure document archive and/or the email account to execute documents such as, for example, obtaining a loan, purchasing insurance, purchasing investments, and/or a variety of other transactions requiring a signature or authentication.

In an embodiment, the provider 110 may send email to the members 115, 120, and/or 125 for a variety of different matters such as, for example, loan payments due, insurance premiums due, notices for activity in financial accounts of the member 115, etc., in order for the provider 110 to obtain a record that the member 115, 120, and/or 125 has received the notice, allowing the provider 110 to obtain confirmation of the receipt of such emails simply by checking the status of the email messages of the member 115. In addition to email, the provider 110 may provide follow-up telephone calls if the member 115, 120, and/or 125 is not responding to email notifications. In an embodiment, the system may have access to telephone voicemails of the member 115, and the system may be operable to convert those telephone voicemails of the member 115 into an electronic audio file that is then accessible through the user page 240. In an embodiment, the news section 250 of the user page 240 may be used to show news articles relating to the provider 110, thus promoting the provider 110 without appearing to be marketing to the member 115, 120, and/or 125. In an embodiment, each of the members 115, 120, and/or 125 may be provided multiple email accounts by the provider 110 such as, for example, providing each member 115 a personal email account and a business email account. In an embodiment, the system may be configured such that when an email message is received by an email account provided by the provider 110, the system sends a voice, text or other notification to the telephone, paging, or other mobile communication system of the member 115 receiving that notification. In an embodiment, the system may receive permission from the member 115, 120, and/or 125 to filter out email messages from particular third parties sending email such as for example, competitors of the provider 110. In an embodiment, the provider 110 may provide comparisons on similar or identical products or services that are offered by both the provider 110 and a competitor if the member 115, 120, and/or 125 is contacted by and/or searching competitors through the user page 240. In an embodiment, the user page 240, the email account, and the other internet related aspects of the present disclosure may be used interchangeably with personal computers, portable computers, other portable electronics, or a variety of other types of internet devices known in the art.

In an embodiment, the system and method described above provide a marketing tool that utilizes that fact that the provider 110 may detect when the member 115, 120, and/or 125 is using the system. For example, upon detection of the member 115, 120, and/or 125 using the system, the provider 110 may send marketing materials or notices through, for example, the email account, that may be immediately noticed by the member 115, 120, and/or 125. Such email messages are nearly instantaneous, allowing the provider 110 to use the email or user page 240 to provide a link or contact information for the member 115, 120, and/or 125 to immediately conduct an online chat or telephone call to reach a live person for assistance, using, for example, a "click to chat with a live representative" button, or other graphical user interface (GUI) to connect the member 115, 120, and/or 125 to the provider 110. In addition, the system may provide a direct telephone number to a representative from the provider 110 that may have contacted the member 115, 120, and/or 125 through the email or the user page 240 such that the member 115, 120, and/or 125 may speak to that particular representative.

In an embodiment, the Internet links 225 on the start page 215 may include links such as, for example, moving links, marriage links, child birth links, and/or other life-changing event links. When the member 115, 120, and/or 125 researches any of these topics, the provider 110 may direct marketing materials related to the respective event, suggest related products and/or services, and/or provide helpful tips via the email account relating to the event. For example, if a member 120 is researching "moving", the provider 110 may send information or links to the member 120 relating to cost of living calculators, moving companies, realtors, mortgages, insurance and/or a variety of other moving related information known in the art. Additionally, the provider 110 may be better able to suggest new accounts or products, improvements to the present accounts or products of the member 115, 120, and/or 125, and/or cancellation of accounts or products of the member 115, 120, and/or 125 by knowing the details of the member's 115, 120, and/or 125 account information, email use, Internet use, and/or any other habits of the member 115, 120, and/or 125 detectable through their use of the user page 240. In an embodiment, the system may allow for a comparison of the product or services of a competitor of the provider 110 when the member 115 enters the details of a competitor's offer using a comparison chart link 225f. The provider 110 may then use the entered competitor's offer to offer a comparable or improved offer, a comparable or improved product or service, and/or inform the member 115, 120, and/or 125 of problems with the competitors product or service such as, for example, by linking the member 115, 120, and/or 125 to reviews of the competitors product and/or service.

Thus, in an embodiment, a system and method are provided in which a provider 110 provides an email account to members 115, 120, and/or 125 in order to direct those members 115, 120, and/or 125 to a web site of the provider 110 more often than would occur by just providing online financial account access, thus allowing marketing of the products and services of the provider 110 to be more focused and effective relative to marketing performed without the provision of such an email account. The present system may be used as an Internet home page so that when the member 115, 120, and/or 125 opens their Internet browser, the user page 240 appears as the opening homepage on that Internet browser. In an embodiment, signing up for the email account provided by the provider 110 may result in the system automatically assigning the user page 240 as the Internet home page of the member 115, 120, and/or 125. Furthermore, the system and method provide the provider 110 with contact information for the members 115, 120, and/or 125 that will exist as long as the member 115, 120, and/or 125 holds a financial account with the provider 110, regardless of whether the member 115, 120, and/or 125 changes their telephone number or physical address. For example, members of the armed forces tend to re-locate often. However, with an email account provided by their financial institution (e.g. the provider 110), the financial institution can establish long-term, stable contact information with that member of the armed forces. In addition, this email account may prove to be one of the most stable means of communication for the member 115, 120, and/or 125 between $3^{rd}$ parties as well as the provider 110 and yet allow the member 115, 120, and/or 125 access to financial accounts, email, news, the provider home page, and more with a single login. As a result, such a system may be marketed to armed forces recruits and others as both a financial service and an email service.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system associated with a financial services company, comprising:
   a member communication engine configured to communicate a financial services company member login web page to a client computer and receive an authentication request from the client computer, the information handling system being communicatively coupled with the client computer via a public packet-based network, the member communication engine including an authentication module configured to authenticate the authentication request as being associated with a member;
   a member database communicatively coupled to the member communication engine and configured to provide to the client computer for display after authentication, a user web page providing a menu of accounts provided by the financial services company and belonging to the member, the menu of accounts to include at least one general-purpose email account and at least one financial account provided by the financial services company; and
   an email server communicatively coupled to the member communication engine and configured to implement the at least one general-purpose email account;
   wherein the member communication engine is configured to detect when the member is using the system, and in response, transmit a marketing material and a competitor comparison to the general-purpose email account of the member.

2. The system of claim 1, wherein the member communication engine is configured to communicate at least one of a set of menus or a set of commands at a display device associated with the client computer to facilitate financial account lookup and maintenance operations.

3. The system of claim 1, wherein the email server is configured to communicate a set of email options at the display device to enable the account holder to send and receive email.

4. The system of claim 1, further comprising:
a document electronic signature module communicatively coupled to the client computer to present a set of menus at the display device to facilitate the account holder's electronically signing documents and to forward documents electronically signed by the account holder to designated recipients.

5. The system of claim 1, further comprising:
a news viewer module communicatively coupled to the client computer to present selected news articles to the account holder.

6. The system of claim 1, further comprising:
a secure document storage facility communicatively coupled to the client computer to present document storage menus at the display device and to archive documents received from the account holder.

7. The system of claim 1, further comprising:
an insurance transaction module communicatively coupled to the client computer to present menus associated with an insurance transaction at the display device and to perform an insurance transaction responsive to a request by the account holder.

8. An article including a non-transitory storage medium comprising computer-executable instructions to cause at least one processor to perform activities, comprising: communicating a financial services company member login web page to a client computer via a public packet-based network; receiving an authentication request from the client computer associated with a member via a public packet-based network, the member having accounts associated with a financial services company; authenticating the member by manipulating a set of semiconductor storage element components of a member communication engine; presenting an account access menu of accounts held by the member at a display device component of the client computer, the account access menu to include at least one financial account and at least one general-purpose email account, and the at least one general-purpose email account implemented using an internet service provider (ISP) associated with the financial services company; and detecting when the member is accessing the account access menu, and in response, transmitting a marketing material and a competitor comparison to the general-purpose email account of the member.

9. The article of claim 8, further comprising computer-executable instructions to cause the at least one processor to perform activities, including:
presenting at least one of a set of menus or a set of commands at the display device via a financial services company member user web page to facilitate financial account lookup and maintenance operations.

10. The article of claim 8, further comprising computer-executable instructions to cause the at least one processor to perform activities, including:
presenting a set of email options at the display device via the financial services company member user web page to enable the account holder to send and receive general-purpose email.

11. The article of claim 8, further comprising computer-executable instructions to cause the at least one processor to perform activities, including:
presenting a set of menus at the display device via the financial services company member user web page to facilitate the member electronically signing documents; and
forwarding documents electronically signed by the member to designated recipients.

12. The article of claim 8, further comprising computer-executable instructions to cause the at least one processor to perform activities, including:
presenting news articles at the display device via the financial services company member user web page.

13. The article of claim 8, further comprising computer-executable instructions to cause the at least one processor to perform activities, including:
presenting menus at the display device related to a secure document storage facility provided to the member by the financial services company; and
storing documents received from the member in a secure document archive using the financial services company member user web page.

14. The article of claim 8, further comprising computer-executable instructions to cause the at least one processor to perform activities, including:
presenting menus associated with an insurance transaction facility at the display device, the insurance transaction facility provided to the member by the financial services company; and
upon request from the member, performing an insurance transaction via the financial services company member user web page.

15. A method of providing consolidated account access, comprising:
receiving an authentication request from a client computer associated with a member at a computer-implemented financial services company member login web page via a public packet-based network, the financial services company member login web page associated with a financial services company;
authenticating the member by manipulating a set of semiconductor storage element components of a member communication engine associated with the financial services company member login web page;
presenting an account access menu of accounts held by the member at a display device component of the client computer, the account access menu to include at least one financial account and at least one general-purpose email account, and the at least one general-purpose email account implemented using an internet service provider (ISP) associated with the financial services company; and
detecting when the member is accessing the account access menu, and in response, transmitting a marketing material and a competitor comparison to the general-purpose email account of the member.

16. The method of claim 15, further comprising:
presenting at least one of a set of menus or a set of commands at the display device via a financial services company member user web page to facilitate financial account lookup and maintenance operations.

17. The method of claim 15, further comprising:
presenting a set of email options at the display device via the financial services company member user web page to enable the account holder to send and receive general-purpose email.

18. The method of claim 15, further comprising:
presenting a set of menus at the display device via the financial services company member user web page to facilitate the member electronically signing documents; and
forwarding documents electronically signed by the member to designated recipients.

19. The method of claim 15, further comprising:
presenting news articles at the display device via the financial services company member user web page.

20. The method of claim 15, further comprising:
presenting menus at the display device related to a secure document storage facility provided to the member by the financial services company; and
storing documents received from the member in a secure document archive using the financial services company member user web page.

21. The method of claim 15, further comprising:
presenting menus associated with an insurance transaction facility at the display device, the insurance transaction facility provided to the member by the financial services company; and
upon request from the member, performing an insurance transaction via the financial services company member user web page.

\* \* \* \* \*